US006200372B1

(12) United States Patent
Krishnan et al.

(10) Patent No.: US 6,200,372 B1
(45) Date of Patent: Mar. 13, 2001

(54) WATER-BASED OFFSET LITHOGRAPHIC NEWSPAPER PRINTING INK

(75) Inventors: Ramasamy Krishnan, Colonia; Neil Young, Oakland; Keqi Gan, Belleville; Marilyn Yamat, Bergenfield; Hugo Babij, Waldwick; Martin Thomas Czebotar, Somerset, all of NJ (US)

(73) Assignee: Sun Chemical Corporation, Fort Lee, NJ (US)

( * ) Notice: Subject to any disclaimer, the term of this patent is extended or adjusted under 35 U.S.C. 154(b) by 0 days.

(21) Appl. No.: 09/464,984

(22) Filed: Dec. 16, 1999

Related U.S. Application Data

(63) Continuation-in-part of application No. 09/179,164, filed on Oct. 26, 1998, now abandoned, which is a continuation-in-part of application No. 08/978,804, filed on Nov. 26, 1997, now abandoned, which is a continuation-in-part of application No. 08/614,587, filed on Mar. 3, 1996, now Pat. No. 5,725,646.

(51) Int. Cl.$^7$ ............................. C09D 11/08; C09D 11/14
(52) U.S. Cl. ................................. 106/31.73; 106/31.69; 106/31.75
(58) Field of Search ........................ 106/31.73, 31.69, 106/31.75

(56) References Cited

U.S. PATENT DOCUMENTS

| | | | |
|---|---|---|---|
| 3,661,619 | 5/1972 | Surland | 427/288 |
| 4,045,232 | 8/1977 | Parkinson | 106/31.66 |
| 4,079,026 | 3/1978 | Mone | 524/513 |
| 4,173,554 * | 11/1979 | Sulzberg | 524/211 |
| 4,419,132 * | 12/1983 | Moynihan | 106/31.67 |
| 4,954,556 * | 9/1990 | Bull et al. | 524/378 |
| 4,981,517 | 1/1991 | DeSanto, Jr. et al. | 106/31.25 |
| 5,098,478 * | 3/1992 | Krishnan et al. | 106/31.89 |
| 5,167,704 * | 12/1992 | Brower | 106/31.66 |
| 5,417,749 * | 5/1995 | Krishnan et al. | 106/31.26 |
| 5,725,646 * | 3/1998 | Krishnan et al. | 106/31.73 |
| 6,020,401 | 2/2000 | Houser et al. | 523/61 |

FOREIGN PATENT DOCUMENTS

| | | | |
|---|---|---|---|
| 0523567 | 1/1993 | (EP) | C09D/11/02 |
| 0543385 | 5/1999 | (EP) | C09D/11/10 |
| WO 97/33750 | 9/1997 | (WO) . | |
| WO 97/33757 | 9/1997 | (WO) | B41M/1/08 |

* cited by examiner

*Primary Examiner*—Helene Klemanski
(74) *Attorney, Agent, or Firm*—Sidney Persley

(57) ABSTRACT

A single fluid water-based offset lithographic news ink comprising water; a macromolecular resin binder comprised of a resin soluble in water regardless of the pH of the water, a rosin salt resin soluble in water at pH ranging from 7.5 to 10 and an aqueous emulsion polymer; pigment; a water dispersible soy bean based polymer; and a hydroxyethylethylene urea re-wetting agent.

16 Claims, No Drawings

WATER-BASED OFFSET LITHOGRAPHIC NEWSPAPER PRINTING INK

This application is a Continuation-In-Part of application Ser. No. 09/179,164, filed Oct. 26, 1998, now abandoned, which was a Continuation-In-Part of application Ser. No. 08/978,804, filed Nov. 26, 1997, now abandoned, which was a Continuation-In-Part of application Ser. No. 08/614,587, filed Mar. 3, 1996, now U.S. Pat. No. 5,725,646.

FIELD OF THE INVENTION

The invention relates to water-based offset lithographic newspaper printing ink.

DESCRIPTION OF RELATED ART

In an attempt to eliminate volatile organic compounds (VOCs) in the pressroom, water-based alternatives are being sought for ink formulations. Water-based printing inks for use in flexographic printing processes are known in the prior art. This type of printing process utilizes printing plates wherein the printing images stand up in relief, i.e. the areas to be printed are raised above the non-printing areas. Printing by the flexographic process requires relatively low pressure while sufficient pressure is applied to transfer the ink from the face of the image carrier to the surface of the substrate. Examples of useful water-based flexographic printing inks are disclosed in U.S. Pat. No. 4,173,554 and *The Printing Ink Manual*, edited by R. H. Leach and R. J. Pierce, pages 571–576, 5th edition, (Blueprint, 1993).

Water-based inks for gravure printing are also well known. In the gravure process, the printing image is engraved into a cylinder in the form of cells which become filled with ink. Printing is achieved by passing the substrate between the gravure cylinder and impression roller under pressure. Examples of useful water-based gravure printing inks are disclosed in U.S. Pat. Nos. 4,954,556 and 5,098,478.

The offset lithographic printing process presents a unique challenge to ink formulators since such process utilizes a planographic printing plate, i.e. the image and non-image areas are in the same plane on the image carrier, and two fluids are concurrently utilized.

It is fairly simple to define an image area by raising it above the background as in the case of the flexographic printing plate or lowering it as in the case of the gravure printing plate; avoidance of ink adhering to the non-image area is not too difficult to achieve. However, when all areas are on the same level, techniques must be utilized to insure that ink adheres only to the image area, and not to the non-image area.

In conventional offset lithographic printing processes, the plate is damped before it is inked with an oil-based ink. Typically, the damping process utilizes a fountain solution such as those described in U.S. Pat. Nos. 3,877,372, 4,278, 467 and 4,854,969. Water will form a film on the hydrophilic areas (i.e. the non-image areas) of the printing plate, but will contract into tiny droplets on the oleophilic areas (i.e. the image areas). When an inked roller containing the oil-based ink is passed over the damped plate, it will be unable to ink the areas covered by the water film (the non-image areas), but will emulsify the droplets on the water-repellant areas (the image areas) and these will ink up. Such process is called offset lithography because the inked image on the plate does not directly print onto the paper substrate, but is first "offset" onto a rubber blanket, and transferred therefrom onto the paper substrate.

As mentioned above, conventional offset lithographic printing processes entails the use of oil-based inks and water-based fountain solutions. The ink/water balance is critical and is quite demanding of the pressman's skills. This issue is one of the several disadvantages associated with such printing processes as compared to flexographic and gravure printing processes. Moreover, the oil-based inks and aqueous fountain solutions typically employed in conventional offset lithographic printing processes contain fairly high levels of undesirable volatile organic compounds ("VOCs").

U.S. Pat. No. 3,356,030 discloses the use of a water-based printing ink in respect to a method of planographic printing utilizing a lithographic printing plate whose non-image areas are coated with a cured coating of a thermosetting silicone resin. However, the patented method also entails the use of a volatile hydrocarbon fountain solution which will coat the non-image areas and which is re-applied between successive printings. Of course, the use of a volatile hydrocarbon fountain solution undermines the principal purpose of the water-based ink compositions of the present invention, i.e. the avoidance of the use of volatile organic compounds ("VOCs") during the printing process. Indeed, the water-based ink compositions of the present invention may be used for offset lithographic printing processes without any fountain solution whatsoever.

In the 1980s, a resurgence of interest occurred in respect to "waterless" lithographic printing processes. Both positive and negative waterless planographic printing plates are commercially available from Toray Industries of Japan. The image area of a waterless planographic plate is a photopolymer similar to that employed for the image area of a conventional plate. However, the non-image area is coated with a polymer such as a silicone which is ink repellant. Further information about waterless printing plates and processes may be found in U.S. Pat. Nos. 5,370,906 and 5,417,749.

The waterless printing process solved two issues: VOCs emanating from the fountain solutions and control of the ink/water balance by the pressman. However, the difference in surface energy between the image and non-image areas of the conventional offset lithographic printing plate is typically 40 dynes/cm is dramatically reduced to 20 dynes/cm in the case of the waterless printing plate. Therefore the latitude between scumming and poor print density is considerably narrowed and the issue of VOCs (emanating from the oil-based ink) still remains in respect to waterless printing.

German Offenlegungsschrift DE 41 19 348 A1 pertains to a moistureless offset printing method and a water-based printing ink. The ink described therein is one which will adhere to hydrophilic materials, but not to hydrophobic materials, and contains a dye, water, 5–50% water-soluble macromolecular binder and a hygroscopic liquid, preferably a multihydric alcohol.

It is an object of the present invention to eliminate the principal disadvantages of conventional offset lithographic printing inks, viz. high levels of VOCs emanating from the oil-based ink and the aqueous fountain solution and the difficulty in controlling the ink/water balance, while preserving the principal advantage of the conventional lithographic printing process, i.e. high surface energy differential between the image and non-image areas of the printing plate.

Such object has been achieved by means of the present invention which comprises a water-based newspaper printing ink that is to be used in offset lithographic newspaper printing processes without the need for any accompanying fountain solutions using a re-wetting agent

SUMMARY OF THE INVENTION

The invention is a water-based single fluid fountain solution free offset lithographic news ink comprising: (a) water; (b) a macromolecular resin binder comprised of: (i) resin soluble in water regardless of the pH of the water, (ii) rosin salt resin soluble in water at a pH ranging from about 7.5 to about 10, and (iii) aqueous emulsions polymer; (c) a water dispersible modified soybean oil based polymer; (d) pigment; and (e) a hydroxyethylethylene urea rewetting agent.

DETAILED DESCRIPTION OF THE INVENTION

The discovery of a highly compatible soya polymer system has enabled us to formulate a waterbased offset lithographic ink for newspaper printing that has low and stable tack and sustains runnability. Once printed on the newspaper the ink has good rub resistance and a cost comparable to conventional oil-based newspaper inks.

Currently, all lithographic offset newspaper printing is done with inks which contain mineral oil or soy bean oils. These inks are also used in conjunction with a fountain solution which typically contains a desensitizer, a salt, and glycol. In order to prevent the evaporation of water from the printing rollers it was desirable to have constant humidity (e.g. see U.S. Pat. No. 5,725,646). This provided advantages over existing compositions, mainly zero V.O.C., water washability, and fast drying. It has now been found that the use of a certain soybean oil modified polymers enable us to eliminate the humidity control requirement and use the existing multiple roller press set-up to print.

The printing plates for use with the newspaper printing ink of the present invention should be such that the image areas thereof are hydrophilic in nature, while the non-image areas are hydrophobic in nature. An example of a suitable printing plate is the "waterless" Toray type discussed above. However, the image area of the plate need not contain a photopolymer. The image area of the plate may comprise, e.g. a grained aluminum surface which has no coating thereon, but is hydrophilic in nature. The non-image area of the plate must, of course, be hydrophobic in nature. However, the non-image area may be covered with any type of hydrophobic material, provided that such hydrophobic material adheres to the non-images area of the plate during the printing process.

Examples of suitable resins soluble in the water regardless of the pH of the water include: carboxymethylcellulose, hydroxyethylcellulose, hydroxypropylcellulose, hydroxybutylmethylcellulose, poly($C_1$–$C_4$) alkylene oxides, polyethyleneimine, polyvinyl alcohol, polyvinyl acetate, polyvinylpyrollidone, polyvinyloxazolidone and polyacrylamide polymers.

Examples of rosin salt resins suitable for use in the present invention are only those resin rosin salts which are soluble in the water at pH ranging from about 7.5 to about 10. Suitable examples of such rosin salt resin binders include maleated or fumarated rosins reacted with polyols such as ethylene glycol, penta erythritol; and trimethylol propane, and the like and their salts. Ammonia or an organic amine such as monoethanolamine or N,N-diethanolamine may be added to the water in order to adjust its pH to a preferred value.

Suitable examples of aqueous emulsion polymers suitable for use in the present invention include acrylic or vinyl emulsion polymers prepared from monomers selected from the group consisting of acrylic acid esters, methacrylic acid esters, acrylic acid esters of polyhydric alcohols, methyl methacrylate, styrene, vinyl styrene and vinyl acetate.

The offset lithographic newspaper printing ink formula of the present invention employs a modified soybean oil. Examples of soybean oils which can be modified to be suitable for use in the present invention are described in U.S. Pat. Nos. 5,167,704 and 4,419,132 which describe, inter alia, non-petroleum soybased oils used to make newspaper inks. The soybean oil based polymers of the present invention are modified to be water dispersible by reacting maleated or fumarated soybean oils with polyols such as ethylene glycol, pentaerythritol, and trimethyl propane, and the like and their salts.

The pigment may be any of those which are suitable for formulating offset lithographic printing inks such as CI Pigment Yellows 1, 3, 4, 5, 12, 13, 14, 17, 55, 65, 73, 83, 97 and 98; CI Pigment Oranges 13, 16 and 46; CI Pigment Reds 2, 3, 4, 10, 12, 48, 48:1, 48:2, 53, 57:2, 81, 104, 146, 170 and 176; CI Pigment Greens 2, 7 and 36; CI Pigment Blues 1, 15:1, 15:2, 15:3, 15:6, 16, 29, 56 and 61; CI Pigment Violets 3, 23 and 37; CI Pigment Blacks 6 and 7; and CI Pigment Whites 6, 7, 18 and 26.

The rewetting agent is preferably hydroxyethyl ethylene urea.

In the water-based offset lithographic news ink of the present invention the water is present in amounts of 5 to 60 wt. %; and more preferably 10 to 20 wt. %. It is also preferred that the macromolecular resin binder be present in amounts of 10 to 70 wt. %; and more preferably 30 to 60 wt. %; and most preferably the macromolecular resin is a composite having up to 5 wt. % of a resin binder soluble in water regardless of the pH of the water; 10 to 70 wt. % of a rosin salt resin soluble in water at a pH ranging from 7.5 to 10; and up to 20 wt. % of an aqueous emulsion resin polymer. The pigment is preferably present in amounts of 2 to 30 wt. %, more preferably 5 to 20 wt % and the soybean oil based modified polymer is present in amounts of 15 to 35 wt %. Finally, the hydroxyethyl ethylene urea rewetting agent is preferably present in amounts from 0.5 to 10 wt. %.

If desired, the usual adjuvants such as waxes, anti-foam agents, biocides, surfactants, corrosion inhibitors, etc. may be incorporated in the inks of the present invention.

In a preferred embodiment of the water-based offset lithographic printing ink of the present invention a non-ionic surfactant is employed in the amount of up to 5 wt. %. Suitable examples of the surfactant include acetylenic glycols, ethoxylated glycols and sorbitan esters.

The water-based news ink of the present invention are further illustrated by the following non-limiting examples in which all parts and percentages are by weight, unless otherwise indicated.

EXAMPLE 1

A water-based news ink was prepared from the components indicated below. The water component of the ink was supplied by the water already present in the acrylic resin latex, hydroxypropyl cellulose, hydroxyethyl ethylene urea and maleated/fumarated rosin ester.

| Component | Amount (wt. %) |
| --- | --- |
| ethylene glycol modified maleated rosin resin | 3–10 |
| Pigment Red 57:2 | 12–20 |
| water | 25–35 |
| modified soybean oil polymer | 20–28 |
| lanolin based surfactant[b] | .5–2 |
| hydroxyethylethylene urea | 10–25 |
| mineral clay[a] | .6–1 |
| Total | 100.00 |

[a]Laponite ® RD a trademark of Southern Clay Products Co.
[b]Fancol ® VB a trademark of Fanning Corp.

(a) Laponite® RD a trademark of Southern Clay Products Co.
(b) Fancol® VB a trademark of Fanning Corp.

EXAMPLE 2

A water-based newspaper printing ink was prepared according to the following formulation:

| Component | Amount (wt. %) |
| --- | --- |
| ethylene gylcol modified maleated rosin resin | 3–10 |
| hydroxyethylethyleneurea[a] | 10–25 |
| mineral clay[b] | 0.6–1.0 |
| modified soybean oil polymer | 20–28 |
| lanolin based surfactant[c] | 0.5–2 |
| water | 25–35 |
| Pigment Red 57:2 | 12–10 |
| Total | 100.00 |

[a]SR-511 RD a trademark of the Sartomer Corp.
[b]Laponite ® RD a trademark of Southern Clay Products.
[c]Fancol ® VB a trademark of Fanning Corp.

(a) SR-511 RD a trademark of the Sartomer Corp.
(b) Laponite® RD a trademark of Southern Clay Products.
(c) Fancol® VB a trademark of Fanning Corp.

EXAMPLE 3

A water-based newspaper printing ink was prepared in accordance with Example 2. The ink was run on a Didde printing press. The printing plate, obtained from Toray industries, had an aluminum oxide substrate coated with a photopolymer whose surface was hydrophilic in nature, while the non-image area was coated with a silicone polymer. The press run was carried out at temperatures ranging from 15–20° C. at a press speed of 1,000 feet per minute (fpm). The print samples obtained from the press run were clear and sharp with stable tack and were fast drying. There was no discernible toning in the non-image area nor observable ink buildup on the rollers, plate or blanket. The results gave excellent print quality.

EXAMPLE 4

A black water-based newspaper printing ink was prepared having the following formulation:

| Component | Amount (wt. %) |
| --- | --- |
| ethylene glycol modified maleated rosin resin | 8.00 |
| monoethanol amine | 2.96 |
| ethoxylated nonionic surfactant[a] | 0.96 |
| carbon black pigment[b] | 19.16 |
| water | 22.54 |
| hydroxyethylethylene urea[c] | 11.17 |
| CaCO3 | 4.99 |
| modified soybean oil polymer | 26.82 |
| synthetic hectorite mineral resembling clay[d] | 1.40 |
| non-ionic primary water/oil emulsifier | 2.00 |
| Total | 100.00 |

[a]Surfonyl ® 420 a trademark of the S.C. Johnson Corp.
[b]Regal ® 400 R a trademark of Cabot Corp.
[c]SR-511 a trademark of the Sartomer Corp.
[d]Laponite ® RD a trademark of Southern Clay Products Co.

(a) Surfonyl® 420 a trademark of the S.C. Johnson Corp.
(b) Regal® 400 R a trademark of Cabot Corp.
(c) SR-511 a trademark of the Sartomer Corp.
(d) Laponite® RD a trademark of Southern Clay Products Co.

The inks were run on a T70 lithographic press manufactured by Goss Graphics at a speed of 50k iph. The printability and runnability of the inks were very good.

EXAMPLE 5

A low tack version of the ink prepared in Example 4 was prepared using the following formulation:

| Component | Amount (wt. %) |
| --- | --- |
| carbon black pigment[a] | 15.0 |
| nonionic primary water/oil emulsifier | 8.5 |
| modified soybean oil resin polymer | 39.0 |
| monoethanol amine | 2.0 |
| hydroxyethylethylene urea[b] | 12.6 |
| water | 21.7 |
| synthetic hectorite mineral resembling clay[c] | 1.2 |
| Total | 100.00 |

[a]Regal ® 400 R a trademark of Cabot Corp.
[b]SR-511 a trademark of the Sartomer Corp.
[c]Laponite ® RD a trademark of Southern Clay Products Co.

(a) Regal® 400 R a trademark of Cabot Corp.
(b) SR-511 a trademark of the Sartomer Corp.
(c) Laponite® RD a trademark of Southern Clay Products Co.

The ink was run on an offset lithographic printing press manufactured by Koenig & Bauer of Germany with no problems. The print samples had a high print quality.

The present invention has been described in detail, including the preferred embodiments thereof. However, it will be appreciated that those skilled in the art, upon consideration of the present disclosure, may make modifications and/or improvements on the invention that fall within the scope and spirit of this invention as set forth in the following claims.

What is claimed is:
1. A single fluid water-based fountain solution free offset lithographic newspaper printing ink comprising: (a) water; (b) a macromolecular resin binder comprised of: (i) resins soluble in water regardless of the pH of the water, (ii) rosin salt resin soluble in water at a pH ranging from about 7.5 to about 10, and (iii) aqueous emulsion polymer; (c) a modified water dispersible soybean oil based polymer; (d) pigment; and (e) a hydroxyethylethylene urea rewetting agent.

2. The ink of claim 1 wherein the amount of water present is 5 to 60 wt. %.

3. The ink of claim 1 wherein the amount of macromolecular resin binder present is 10 to 70 wt. %.

4. The ink of claim 1 wherein the resins soluble in the water regardless of the pH of the water are selected from the group consisting of carboxymethylcellulose, hydroxyethylcellulose, hydroxypropylcellulose, hydroxybutylmethylcellulose, poly($C_1$–$C_4$)alkylene oxides, polyethyleneimine, polyvinyl alcohol, polyvinyl acetate, polyvinyl-pyrollidone, polyvinyloxazolidone and polyacrylamide.

5. The ink of claim 1 wherein the rosin salt resins soluble in the water at a pH of about 7.5 to about 10 are selected from the group consisting of maleated or fumarated rosins reacted with polyols and their salts.

6. The ink of claim 5 wherein the polyol is selected from the group consisting of ethylene glycol, pentaerythritol, trimethylolpropane and their salts.

7. The ink of claim 1 wherein the aqueous emulsion polymers are selected from the group consisting of acrylic or vinyl emulsion polymers prepared from monomers selected from the group consisting of acrylic acid esters, methacrylic acid esters, acrylic acid esters of polyhydric alcohols, methyl methacrylate, styrene, vinyl styrene and vinyl acetate.

8. The ink of claim 1 wherein the modified soybean oil based polymer is prepared by reacting maleated or fumarated soybean oils with polyols and their salts.

9. The ink of claim 8 wherein the polyol is selected from the group consisting of ethylene glycol, pentaerythritol, trimethylolpropane and their salts.

10. The ink of claim 1 wherein the amount of modified soybean oil based modified polymer present is 15 to 35 wt %.

11. The ink of claim 1 wherein the amount of pigment present is 2 to 30 wt. %.

12. The ink of claim 11 wherein the amount of the pigment present is 5 to 20 wt %.

13. The ink of claim 1 wherein the pigment is selected from the group consisting of CI Pigment Yellows 1, 3, 4, 5, 12, 13, 14, 17, 55, 65, 73, 83, 97 and 98; CI Pigment Oranges 13, 16 and 46; CI Pigment Reds 2, 3, 4, 10, 12, 48, 48:1, 48:2, 53, 57:2, 81, 104, 146, 170 and 176; CI Pigment Greens 2, 7 and 36; CI Pigment Blues 1, 15:1, 15:2, 15:3, 15:6, 16, 29, 56 and 61; CI Pigment Violets 3, 23 and 37; CI Pigment Blacks 6 and 7; and CI Pigment Whites 6, 7, 18 and 26.

14. The ink of claim 1 further comprising a non-ionic surfactant.

15. The ink of claim 14 wherein the non-ionic surfactant is present in an amount of up to 5 wt. %.

16. The ink of claim 14 wherein the nonionic surfactant is selected from the group consisting of acetylenic glycols, ethoxylated glycols and sorbitan esters.

* * * * *